US012383471B2

(12) United States Patent
Bijlsma

(10) Patent No.: US 12,383,471 B2
(45) Date of Patent: Aug. 12, 2025

(54) DEVICE FOR FILLING A MEDICINE-UNIT CONTAINER FOR USE IN A MEDICINE UNIT DISPENSING DEVICE, MEDICINE-UNIT CONTAINER, ASSEMBLY OF SUCH DEVICE AND A CONTAINER AND METHOD FOR CLEANING SUCH DEVICE

(71) Applicant: DD Innovations B.V., Liempde (NL)

(72) Inventor: Dennis Raymond Bijlsma, Tuk (NL)

(73) Assignee: DD INNOVATIONS B.V., Liempde (NL)

( * ) Notice: Subject to any disclaimer, the term of this patent is extended or adjusted under 35 U.S.C. 154(b) by 0 days.

(21) Appl. No.: 17/844,277

(22) Filed: Jun. 20, 2022

(65) Prior Publication Data

US 2022/0401307 A1 Dec. 22, 2022

(30) Foreign Application Priority Data

Jun. 20, 2021 (NL) ...................................... 2028490
Jun. 20, 2021 (NL) ...................................... 2028491
Jul. 16, 2021 (NL) ...................................... 2028765

(51) Int. Cl.
*A61J 7/00* (2006.01)
*B65B 39/12* (2006.01)
*B65B 55/24* (2006.01)
*G07F 17/00* (2006.01)

(52) U.S. Cl.
CPC ............. *A61J 7/0084* (2013.01); *B65B 39/12* (2013.01); *B65B 55/24* (2013.01); *G07F 17/0092* (2013.01)

(58) Field of Classification Search
CPC ...... G07F 17/0092; G16H 20/13; B65B 39/12
See application file for complete search history.

(56) References Cited

U.S. PATENT DOCUMENTS

| | | | | |
|---|---|---|---|---|
| 2,936,189 A * | 5/1960 | Pearson | E05B 65/0014 | 220/326 |
| 4,746,008 A * | 5/1988 | Heverly | B65D 55/02 | 220/837 |
| 5,067,755 A * | 11/1991 | James | E05B 65/0075 | 109/59 R |
| 7,549,541 B2 * | 6/2009 | Brozell | B65D 83/0463 | 206/532 |
| 8,880,219 B1 * | 11/2014 | Balasubramanian | A61J 7/02 | 700/240 |
| 11,702,257 B2 * | 7/2023 | Burek | B65D 43/16 | 220/324 |
| 2005/0150805 A1 * | 7/2005 | Burchell | B65D 51/28 | 206/533 |
| 2009/0255842 A1 * | 10/2009 | Brozell | B65D 83/0463 | 206/538 |
| 2012/0031043 A1 * | 2/2012 | Yuyama | G07F 17/0092 | 53/167 |
| 2015/0090733 A1 | 4/2015 | Park | | |
| 2021/0093513 A1 * | 4/2021 | Nishio | G16H 20/13 | |

* cited by examiner

*Primary Examiner* — Timothy R Waggoner

(74) *Attorney, Agent, or Firm* — The Dobrusin Law Firm, PC

(57) ABSTRACT

The invention relates to a device for filling a medicine-unit container for use in a medicine unit dispensing device, comprising a support for the container, adapted to fix the position of the container relative to the device and limit a movement of the container relative to the device and at least one movable push element, such as a rod or pin, operable relative to the support, for pushing an unlocking element of a container supported by the device.

15 Claims, 5 Drawing Sheets

DEVICE FOR FILLING A MEDICINE-UNIT CONTAINER FOR USE IN A MEDICINE UNIT DISPENSING DEVICE, MEDICINE-UNIT CONTAINER, ASSEMBLY OF SUCH DEVICE AND A CONTAINER AND METHOD FOR CLEANING SUCH DEVICE

The present invention relates to a device for filling a medicine-unit container for use in a medicine unit dispensing device, to such container, to an assembly of such device and a container, and to a method for cleaning such device.

Medicine-unit containers are used in a medicine unit dispensing devices, that dispense medicines for composing customized medicine packages for people requiring a specific medicine combination of medicines. The dispensing devices may comprise numerous containers with different medicine-units, in some cases more than one thousand different medicine units and thus more than one thousand different medicine-units.

During use, the containers must be refilled to assure availability of all medicine-units at all times, and this process is often done manually. The container may be taken out of the medicine unit dispensing device and access to its contents is provided, for instance by removing a lid of the container. Then, new medicine-units are added, and the container is used again.

This process of refilling introduces the risk of adding wrong medicine-units into a container. A wrong medicine may be a medicine with different active compounds or purpose, but also a different dose than intended may lead to harm of patients.

The invention also relates to a container for medicine units intended for a medicine unit delivery device. Medicine unit delivery devices are known in the art, for example from the US patent application US2015090733. This application describes a device for dispensing medicine and dietary doses, wherein the medicine units are stored in a container.

The containers according to the art have several disadvantages however. One important disadvantage is that unauthorised (re-)filling is not adequately prevented, with the result that personnel operating a medicine unit delivery device may add wrong medicine units into the container. This may be completely different medicines, but also the right type of medicine but with a wrong dose. Since a medicine unit delivery device may comprise multiple containers with different contents, mixing the containers up is a further risk; a correct medicine in the wrong container may also cause a risk. Additionally because shelf life for medicine units may be important to be monitored, it may be desired to keep track of filling and refilling activities, and in some cases the same may go for inventory management or security reasons. For all of the above it may be preferred that access to the containers takes place in a controlled manner.

It is a goal of the present invention to provide a solution for the above-mentioned disadvantages of the prior art, or at least to provide a useful alternative to the prior art.

The invention thereto proposes a device for filling a medicine-unit container for use in a medicine unit dispensing device, configured to enable opening or to open a container that is designed such that it requires tooling to be opened. The container may for instance have a lock for this purpose. The lock may comprise a hook or a blockage that must be removed before the container can be opened and opening the container may for instance comprise opening a lid thereof. The hook or blockage may be biased to a preferred locked position by a mechanical force such as a spring force. It may be possible to reach an unlocked or opened position by exerting a mechanical force on a (part of) the device, but an electric or magnetic actuation of the lock are also thinkable, for instance by magnetically removing a ferro-magnetic part from a locking position. The device for filling a medicine-unit container according to the invention may thereto comprise either mechanical, magnetic or electric means for moving a lock for a lid of a medicine-unit container from its locked to an unlocked state. Preferably the container is as simple as possible while more complex technology is in the device for filling.

In a preferred embodiment the invention proposes a device for filling a medicine-unit container for use in a medicine unit dispensing device, comprising a support for the container, adapted to fix the position of the container relative to the device and limit a movement of the container relative to the device, at least one movable push element, such as a rod or pin, operable relative to the support, for pushing an unlocking element of a container supported by the device. The support may be arranged to carry a bottom side of the container, but it may also grip or enclose the container at side walls thereof.

Such mechanic solution and embodiment allow to keep the container construction very simple and thus robust and easy to manufacture. In general, it provides the advantage that containers can be used with a reduced risk of mixing up medicine-units and filling a container with wrong contents.

The support may comprise a support surface for placing the container thereon, and the at least one movable push element may be movable at a distance in a direction perpendicular to the support surface with at least one directional component in a plane parallel to the support surface. This is beneficial when the container is an elongate container having a bottom surface on which it can be supported and a lid forming a top surface at a vertical distance from the bottom surface. Opening the lid may be enabled by pushing a predetermined part of the container, for instance at a side wall thereof. However, the pushing operation may—depending on the container configuration—also take place from the top side of the container in a downward direction.

The device according to the invention may comprise at least two displaceable pushing elements which can be displaced with at least one directional component towards each other. This way they can clamp the container and push one or more engaging surfaces of the container, to enable opening the lid.

The device according to the invention may comprising a limiter for movement of the container relative to the support surface in a direction parallel to that of the support surface and/or a limiter for rotation of the container relative to the support surface. Such limiter may in particular be designed such that there is only one way to mount a specific container designed and/or intended for cooperation with the device according to the invention. An asymmetric profile may be applied on both the device and the container. This also ensures that the container lid opens in an intended direction and that the push element encounters the unlocking element of a container supported by the device.

The invention further relates to a device as described above, comprising a reader for a machine-readable identifier such as a barcode, a magnetic code, an RFID or a chip, in particular an identifier of a container or of a package with medicine-units. Such reader allows the device to verify what container is supported and to base further actions on information read from for instance the information read from a container. The reader may be used for multiple purposes, for instance also for reading details from a refill package of medicine units, and even from a badge or card an employee that wants to operate the device according to the invention. The device according to the invention may also comprise multiple readers, which may be integrated or externally coupled. For instance, a (bar code) reader may be coupled to the device for reading a code on a refill package of medicine units. Making use of multiple readers provides the advantage that a simultaneous scan can be required, increasing the devices protection against wrong use.

The device according to the invention may comprise a data processing unit for processing data read from an identifier of a container and data read from an identifier of a package with medicine-units. Such data processing unit may also be arranged for comparing the identifiers and disabling movement of the pusher or a magnetic or electric equivalent if a first predetermined condition applies and enabling a movement of the pushing element if a second predetermined condition applies.

In a further embodiment, the device according to the invention comprises at least one supply device for supplying ionized air to a placed container. Ionized air has the effect that it ensures that medicine dust particles, that arise from accidental breaking or medicine-unit sanding along, can be removed better. Ionization involves shooting negatively charged ions into the air to change the charge of positively charged particles. Negatively charged ions may attract dust, which causes the particles to weigh down and fall to the bottom. This way they end up on the bottom can be extracted better.

This ionized air may be produced by means of special nozzles blown into the container by a movement from top to bottom. The device according to the invention may therefore comprise a guide or carrier to support the nozzles. The ionized air may be targeted at specific places such as the walls of the container, and so push the particles downwards. This may be done for instance for approximately five seconds.

There may be a simultaneous suction of air applied from the bottom of the container through its admission opening. This will remove the particles present in the container and discharge them in a vacuum cleaner. Such vacuum cleaner may be provided with a medical hepa filter.

The container may be provided with an interior that enables guidance of medicine-units from the receiving opening to the dispensing opening. Such guidance may comprise a rotational part in the container which is configured to be driven by an external drive means. The device according to the invention may be configured to drive such rotational part during the application of ionized air and/or suction of air. This way, cross-contamination of medicine units is avoided in the machine according to the invention. It may be provided with an air discharge or extraction device, for discharging air from a placed container and a drive device for driving an interior part present in a placed container. It may further comprise a funnel movable between a position in which it enables opening of a lid of a container placed on the support and a position in which it disables opening of a lid of a container placed on the support. Such funnel may in particular be used when filling a container with special medicines, that have to be added one by one. The invention also relates to an assembly of a device as described above and a container for medicine-units such as pills, tablets or parts thereof, which container is intended for use in a medicine unit dispensing device, and:

A container body comprising a space surrounded by walls for holding a number of medicine-units, the container body provided with at least one:

admission opening for the medicine-units; and at least one dispensing opening for the medicine-units; and Comprising a valve for the receiving opening, which is movable between an open position for supplying medicine-units and a closed position for closing the container, the valve being lockable with the container at least in the closed position, wherein the container comprises an element to be pushed towards the inside of the container for unlocking the valve, and wherein the at least one pushing element of the device is adapted for forcing the element to be pushed towards the inside of the container to the inside of the container.

It is a further aspect of the present invention to propose a container for medicine units such as pills, tablets or parts thereof, adapted and/or configured for use in a medicine unit delivery device, the container comprising: a container body, comprising a space surrounded by walls for holding an amount of medicine units, the container body being provided with at least one receiving opening for the medicine units; and at least one dispensing opening for the medicine units, a lid for the receiving opening, which is movable between an open position for supplying medicine units and a closed position for closing the container, the lid being lockable with the container at least in the closed position.

The lockable lid prevents unintended access to the container from personnel operating the machine, and thus uncontrolled and unintended (re-)filling actions, or unauthorised removal of medication units through the receiving opening. The lid may in particular be coupled to the container body by means of a hinge and thus be rotatable with respect to the container body. Evidently, dispensing medicine units may be controlled as well, in a sense that will be explained lateron in the present application, but which avoids unintended addition or removal of medicine units.

Since the container according to the invention is intended for use in a medicine unit delivery device that comprises multiple similar or identical containers, from which medication units are to be dispensed in an automated manner, mixing up containers and unintentionally filling them up with the wrong contents is to be prevented once more.

The lid is preferably fixedly coupled to the container body, in particular such that the lid can be brought in the opened position without being taken off the container body, and more in particular wherein the lid is coupled to the container body by mean of a hinge. Because medicine unit delivery devices may comprise multiple containers according to the present invention, this reduces the risk of mixing up lids of different containers, and therewith contamination of containers with remainings of different medicine units.

In an embodiment of the invention, the locking device is provided with at least one barb or hook which must be urged towards the inside of the container for unlocking the lid, wherein an engaging surface of the barb or hook for unlocking thereof is recessed inside the container wall, preferably in such a manner that manual opening is prevented. The barb or hook may comprise a hook extending from the lid surface to the inside of the container, wherein the container wall has a cavity or through hole for receiving the barb or hook, projecting from the inside of the container to the outside. The barb or hook may have a bias tension in a direction toward the outside of the container, which may be a direction parallel to the plane of the lid in case the lid is (essentially) flat. By situating the engaging surface (or area) of the barb or hook recessed with respect to the container wall, it becomes difficult to manually open the lid, that is: manually means without tooling. For that reason, a recess or through hole allowing to reach the barb or hook for unlocking the lid should be smaller than a fingertip, in particular a few square millimetres. Typically, it may be 2×10 or 2×5 mm or smaller, up to 0.5×0.5 mm. Also the latter measurement may be sufficient to insert a tool like a pin for unlocking the barb or hook and thus enabling to open the lid.

Preferably, the locking device comprises multiple barbs or hooks, that may be arranged in different walls or wall parts, so that the barbs or hooks have to be moved in different directions to unlock the lid. This makes it even more difficult to unlock the lid without proper and intended tooling.

In a further embodiment, the container body is provided with at least one transparent part for determining the type and/or number of medicine units present from the outside of the container. The transparent part may be a window in the container wall, or the entire container wall is made from a transparent material. Preferably the material is not coloured, so fully clear, to maximize the visibility and the possibility to do a visual inspection of the containers contents.

In a further embodiment, the container comprises a separated space for holding at least one reference medicine unit, wherein the separated space is also provided with at least one transparent part adjacent to an outside of the container, for being able to visually verify that the medicine units in the space for holding an amount of medicine units match the medicine unit in the separated space.

In the separated space, an example medication unit can be placed, that serves as a visual reference, so that when (re-)filling the container, a direct check can take place whether the newly filled medicine units match the one in the separated space in size, shape, colour and the like.

In a preferred embodiment, the separated space forms part of, or is included in the lid. This way, a distinct position of the example medicine unit is guaranteed, which makes it easy to distinguish the example from the filling of the container.

The above described visual determination of the correct medicine unit may normally be a human action, although machine aided visual recognition is possible too.

However, to avoid mistakes by human personnel, the container may be provided with a machine-readable identifier, such as a bar or QR code, an RFID tag, a chip or a magnetic code, in particular arranged in the lid. The identifier may comprise data that describes the medicine unit, its contents, size, dose and all other relevant information, and may be compared with machine readable information on a packaging with filling content for the container prior to (re-) filling it.

The container according to the invention may further comprise a cantilever for engagement by a robot, which cantilever is for instance adapted to receive two spaced pins or hooks and which holder is in particular connected to the lid. Machine handling of the container is preferred, since the dispensing machines the containers according to the invention are comprised in, may comprise a register with tens and even hundreds of containers, which are all to be positioned in a dispensing position and stored again when the medicine units they comprise are temporarily not needed to be dispensed.

For dispensing a medicine unit, the container according to the invention may comprise a slot that is displaceable relative to the dispensing opening, which slot comprises a space open on two sides, a first side being adjacent to the space for holding the amount of medicine units and a second side facing a wall portion in which the dispensing opening is located, and wherein the movable slot is movable between a first position in which the opening in the second side is aligned with the dispensing opening and a second position in which the opening in the second side is at least partially blocked. By moving the slot, a medicine unit can be moved from the inner (holding) space of the container to the dispensing opening and then fall out of the container.

The container may comprise a rotation shaft about which a body eccentrically comprising the slot can be arranged, as well as such a body, wherein the rotation shaft is provided with engaging means accessible from the outside of the container for being rotated and thereby moving the slot. It may further comprise a guide for guiding medicine units from the space for holding the amount of medicine units to the slot.

The present invention also relates to a device for filling a container according to any one of the preceding claims, comprising a support for the container, and an unlocking device for the lid, in particular comprising at least one pusher for the barb or hook or an engaging surface for moving the barb or hook, movable in the direction of the space for holding the amount of medicine units of the holder. The device for filling the container may preferably comprise a reader for the machine-readable identifier, a reader for a machine-readable identifier of a pack of medicine units, and a data processing unit adapted to enable operation of the unlocking device only when out of the identifier of the package of medicine units shows that the medicine units are intended to be placed in the holder, and blocking the unlocking action if the identifier of the pack of medicine units shows that the medicine units are not intended to be placed in the holder.

The present invention also relates to a medicine unit delivery device comprising at least one container of the above described type, wherein the container comprises a rotation shaft about which a body eccentrically comprising the slot is be arranged, as well as such a body, wherein the rotation shaft is provided with engaging means accessible from the outside of the container for being rotated and thereby moving the slot and wherein the medicine unit delivery device comprises a rotatable drive for engaging the engaging means of the shaft. It may further comprise a guide for guiding medicine units from the space for holding the amount of medicine units to the slot.

The invention will now be elucidated into more detail with reference to the following figures, wherein.

Figure 1:
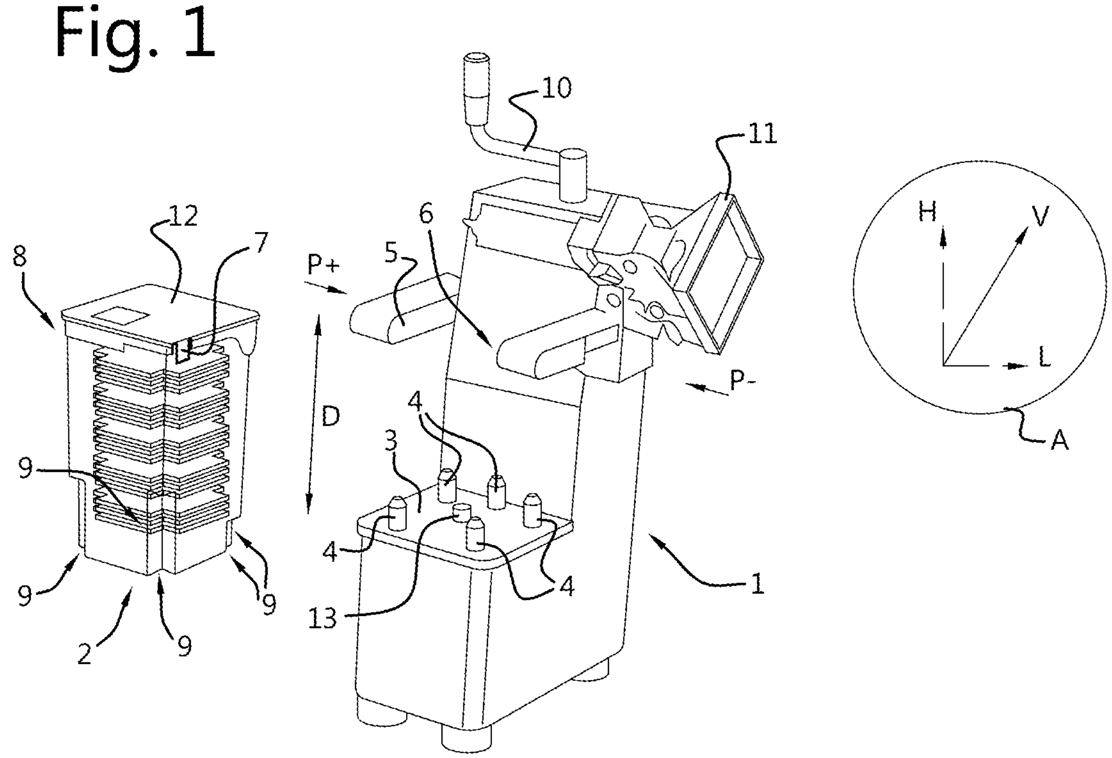
FIG. 1 shows a device according to the invention and a container for medicine-units.

FIG. 1 shows a device 1 according to the invention and a container 2 for medicine-units. The device 1 comprises a support 3 for the container, adapted by means of pins 4 to fix the position of the container 2 relative to the device 1 and limit a movement of the container 2 relative to the device 1. The device 1 comprises two movable push elements 5, 6, formed by pins, operable relative to the support 3, for pushing an unlocking element 7, 8 of a container 2 supported by the device 1. Push elements 5, 6 are movable at a distance D in a direction perpendicular to the support surface 3 with at least one directional component P+ and P− respectively in a plane parallel to the support surface 3. The term directional component is known in the art, but for the sake of completeness insert A shows that vector V has a directional component H in the height direction and a directional component L in a length direction, wherein the Length and Height directions are perpendicular. "Having a directional component" in a certain direction means having such component with a length different than 0.

As can be seen in the figure, the assembly of the device 1 and the container 2 comprise cooperating positioning elements for allowing the container to be received by the support only in a unique mutual manner relative to each other. For every pen 4 on the support surface there is a corresponding cavity 9 in the container. The device 1 has an operating member 10 for operating the push elements 5 and 6 and a funnel 11 movable between a first position (shown) in which it enables opening of a lid 12 of a container 2 placed on the support and a second position (shown in FIG. 2) in which it disables opening of a lid 12 of a container 2 placed on the support 3.

Figure 2:
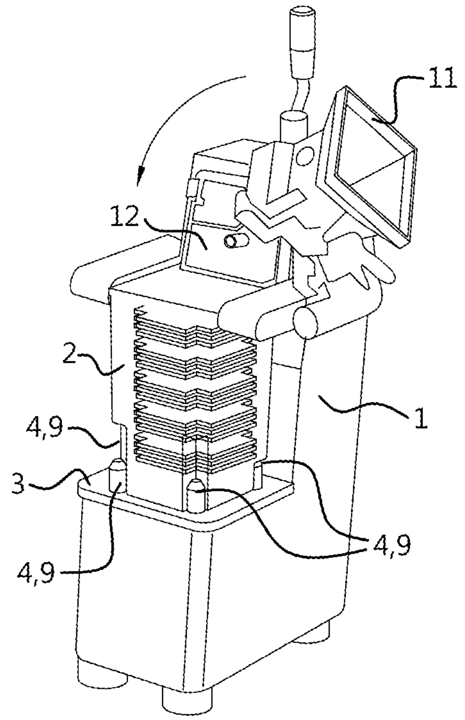
FIG. 2 shows an assembly of the device and container from FIG. 1.

FIG. 2 shows an assembly of the device 1 and container 2 from FIG. 1, wherein the funnel 12 is moved in a direction B by means of rotation, from the first position to the second position. The lid 12 of container 2 is in its open position and the container can be filled once the funnel is in the second position.

Figure 3:
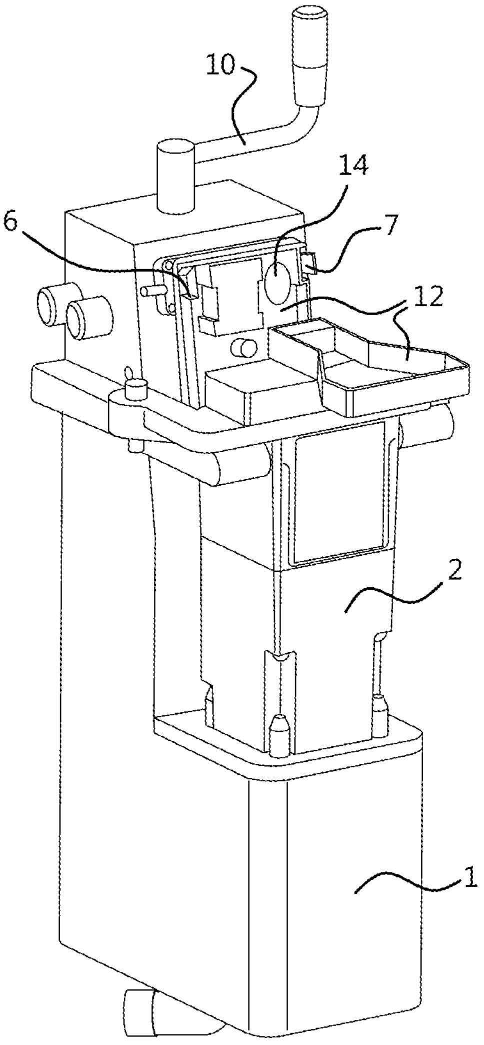
FIG. 3 shows a detailed view of a device according to the invention supporting a container.

FIG. 3 shows a detailed view of a device 1 according to the invention supporting a container 2 wherein the funnel is completely in the container 2. The container 2 is provided with a machine-readable identifier 14 for information about medicine to be placed in the container.

Figure 4:
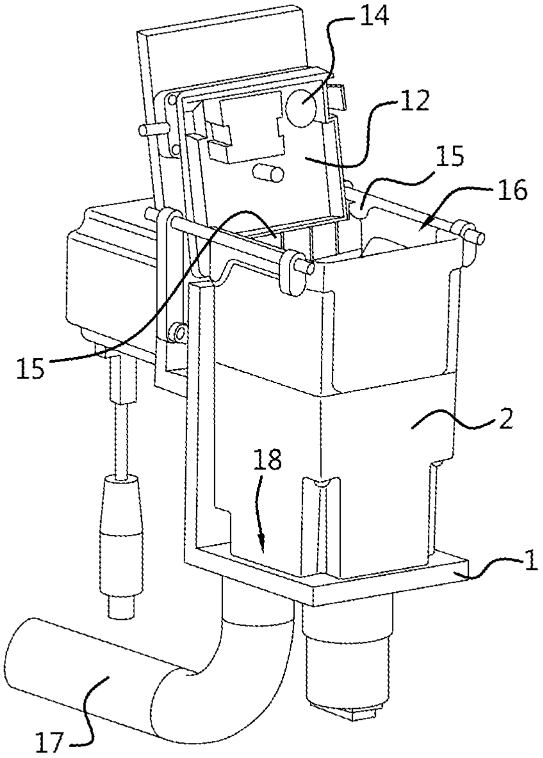
FIG. 4 shows a device according to the invention.

FIG. 4 shows a device 1 according to the invention, comprising nozzles 15 for supplying ionized air to the receiving opening 16 of the container 2 and extracting means 17 for extracting air from the discharge opening 18 of the container 2. The container 2 is provided with a movable portion (not visible) for moving medicine-units from the space for holding the medicine-units to the dispensing opening and the device 1 comprises drive means 13 (visible in FIG. 1) for moving and in particular rotating the movable portion.

Figure 5:
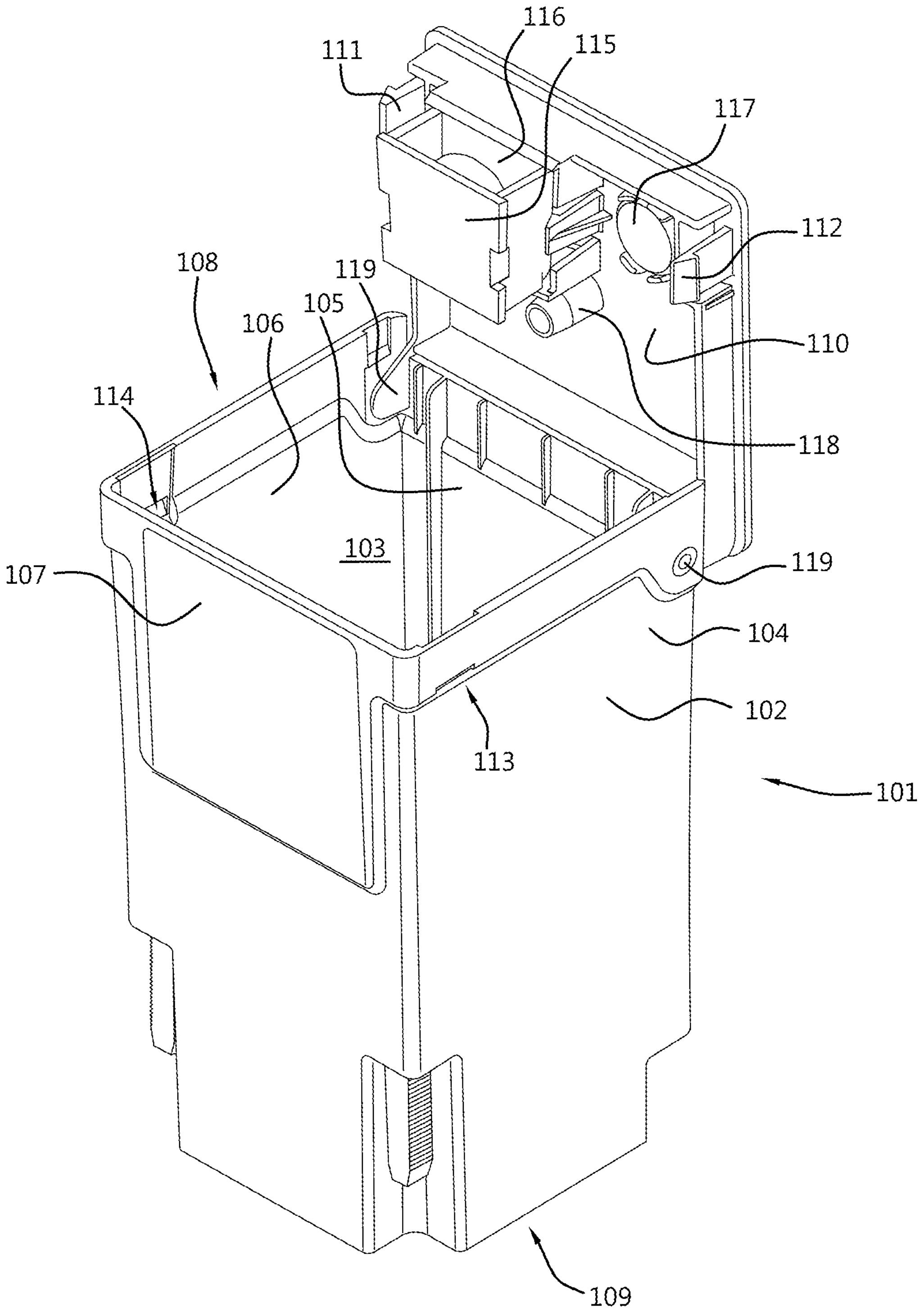
FIG. 5 is a first perspective view of a container according to the present invention.

FIG. 5 shows a container 100 for medicine units such as pills, tablets or parts thereof, for use in a medicine unit delivery device, the container comprising a container body 102, comprising a space 103 surrounded by walls 104, 105, 106, 107 for holding an amount of medicine units, the container body being provided with at least one receiving opening 108 for the medicine units and at least one dispensing opening 109 (not visible) for the medicine units, and a lid 110 for the receiving opening 108, which is movable between an open position (shown) for supplying medicine units and a closed position (shown in FIG. 6) for closing the container 101, the lid 110 being lockable with the container 101 at least in the closed position.

The lid may be lockable with at least one barb 111 (and in this case a second barb 112) which must be urged towards the inside of the container for unlocking the lid, wherein an engaging surface of the barb for unlocking thereof is recessed 113, 114 inside the container wall, preferably in such a manner that manual opening is prevented. The container body 102 is transparent part for determining the type and/or number of medicine units present from the outside of the container and it comprised a separated space 115 for holding at least one reference medicine unit, wherein the separated space 115 is also provided with at least one transparent part 116 adjacent to an outside of the container 102, for being able to visually verify that the medicine units in the space for holding an amount of medicine units match the medicine unit in the separated space.

Figure 6:
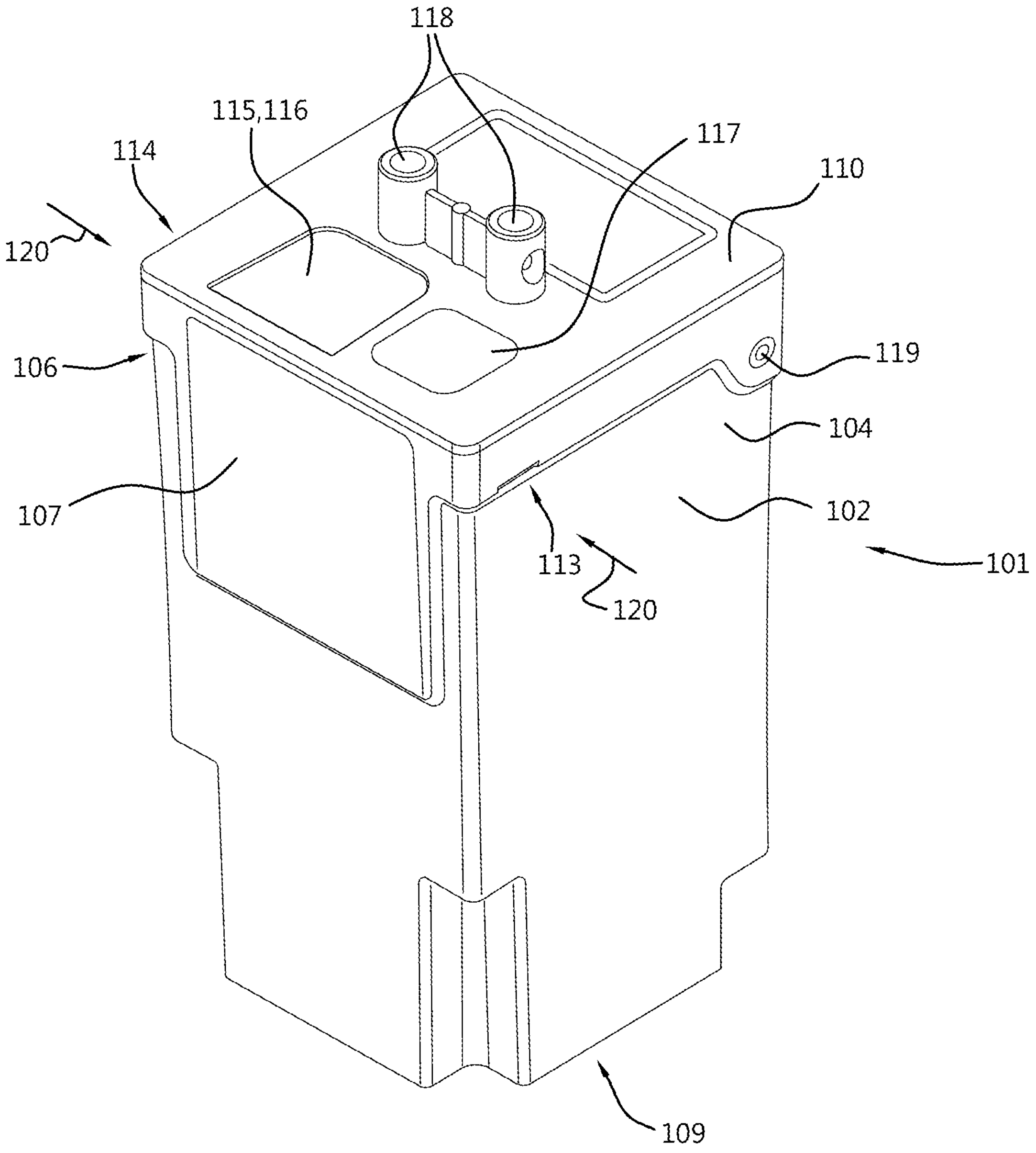
FIG. 6 is a second perspective view of a container according to the present invention.

FIG. 6 shows the container 101 from FIG. 5 in the closed position. It is visible that the separated space 115 forms part of or is included in the lid. The container 101 is further provided with a machine-readable identifier, in this case a chip 117, arranged in the lid.

The container further comprises a cantilever 118 for engagement by a robot, which cantilever 118 is adapted to receive two spaced pins or hooks and which cantilever is in particular connected to the lid 110. The lid 110 is hinged to the container body 102 with hinges 119.

In order to open the lid 110 of the container 102, a pusher has to be inserted in the recesses 113, 114, which are through holes in the container walls 104 and 106, wherein the pusher has to press in the directions 120.

The examples given above are exemplary only and in no sense limit the scope of protection as defined by the following claims.

The invention claimed is:

1. Device for filling a medicine-unit container for use in a medicine unit dispensing device, comprising:

A support for the container, adapted to fix the position of the container relative to the device and limit a movement of the container relative to the device;

At least two displaceable pushing elements, the at least two displaceable pushing elements selected from the group of a rod or a pin, operable relative to the support, for pushing an unlocking element of a container supported by the device, wherein the at least two displaceable pushing elements are displaceable with at least one directional component towards each other, and wherein the container comprises two container-elements, arranged in different walls or wall parts, to be pushed towards the inside of the container for unlocking the valve, and wherein the at least one pushing element of the device is adapted for forcing the container-elements to be pushed towards the inside of the container, each container-element in a different direction; and A funnel movable between a position in which it enables opening of a lid of the container placed on the support and a position in which it disables opening of the lid of the container placed on the support.

2. Device according to claim 1, wherein the support comprises a support surface for placing the container thereon, and the at least one movable push element is movable at a distance in a direction perpendicular to the support surface with at least one directional component in a plane parallel to the support surface.

3. Device according to claim 2, comprising a limiter for movement of the container relative to the support surface in a direction parallel to that of the support surface and/or a limiter for rotation of the container relative to the support surface.

4. Device according to claim 1, comprising a reader for a machine-readable identifier selected from the group of a barcode, a magnetic code, an RFID or a chip, in particular an identifier of the container and/or of a package with medicine-units.

5. Device according to claim 4, comprising a data processing unit for processing data read from the identifier of the container and/or data read from the identifier of the package with medicine-units, the data processing unit also being arranged for comparing the identifiers and disabling movement of the pushing element if a first predetermined condition applies and enabling a movement of the pushing element if a second predetermined condition applies.

6. Device according to claim 1, comprising at least one supply device for supplying ionized air to a placed container.

7. Device according to claim 1, comprising an air discharge device, in particular an extraction device, for discharging air from a placed container.

8. Assembly of a device according to claim 1 and the container for medicine-units selected from the group of pills, tablets or parts thereof, which container is intended for use in a medicine unit dispensing device, and:

A container body comprising a space surrounded by walls for holding a number of medicine-units, the container body provided with at least one:

receiving opening for the medicine-units; and at least one dispensing opening for the medicine-units; and Comprising a valve for the receiving opening, which is movable between an open position for supplying medicine-units and a closed position for closing the container, the valve being lockable with the container at least in the closed position, wherein the container comprises an element to be pushed towards an inside of the container for unlocking the valve, and wherein the at least one pushing element of the device is adapted for forcing the element to be pushed towards the inside of the container.

9. Assembly according to claim 8, wherein the container and the device comprise cooperating positioning elements for allowing the container to be received by the support only in a unique mutual manner relative to each other.

10. A container for medicine units selected from the group of pills, tablets or parts thereof, for use in a medicine unit delivery device, the container comprising:

A container body, comprising a space surrounded by walls for holding an amount of medicine units, the container body being provided with at least one:

intake opening for the medicine units; and at least one dispensing opening for the medicine units;

A lid for the receiving opening, which is movable between an open position for supplying medicine units and a closed position for closing the container, the lid being lockable with the container at least in the closed position;

wherein the locking device is provided with multiple barbs or hooks which must be urged towards the inside of the container for unlocking the lid, wherein an engaging surface of the barb or hook for unlocking thereof is recessed inside the container wall, in such a manner that manual opening is prevented, wherein the barbs or hooks are arranged in different walls or wall parts, so that the barbs or hooks have to be moved in different directions to unlock the lid; and wherein the medicine unit delivery comprises a funnel moveable between a position in which it enables opening of the lid of the container placed on a support and position in which it disables opening of the lid of container placed on the support.

11. Container according to claim 10, wherein the lid is fixedly coupled to the container body, in particular such that the lid can be brought in the opened position without being taken off the container body, and more in particular wherein the lid is coupled to the container body by mean of a hinge.

12. Container according to claim 10, wherein the container body is provided with at least one transparent part for determining the type and/or number of medicine units present from the outside of the container.

13. Container according to claim 10, comprising a separated space for holding at least one reference medicine unit, wherein the separated space is also provided with at least one transparent part adjacent to an outside of the container, for being able to visually verify that the medicine units in the space for holding an amount of medicine units match the medicine unit in the separated space.

14. Container according to claim 13, wherein the separated space forms part of or is included in the lid.

15. Container according to claim 10, comprising a cantilever for engagement by a robot, which cantilever is adapted to receive two spaced pins or hooks and which holder is in particular connected to the lid.

* * * * *